(12) United States Patent
Elkins

(10) Patent No.: US 6,742,217 B1
(45) Date of Patent: Jun. 1, 2004

(54) READILY REPLACEABLE AUTOMOTIVE WIPER BLADE

(76) Inventor: Richard Elkins, 121 Bearden Dr. #13, Marietta, GA (US) 30060

( * ) Notice: Subject to any disclaimer, the term of this patent is extended or adjusted under 35 U.S.C. 154(b) by 0 days.

(21) Appl. No.: 10/315,199

(22) Filed: Dec. 10, 2002

(51) Int. Cl.[7] .................................................. B60S 1/38
(52) U.S. Cl. .............................. 15/250.43; 15/250.45; 15/250.35; 15/250.36
(58) Field of Search ...................... 15/250.451, 250.452, 15/250.453, 250.454, 250.4, 250.41, 250.48, 250.361, 250.44, 250.43, 250.351

(56) References Cited

U.S. PATENT DOCUMENTS 3,099,031 A * 7/1963 Ludwig .................. 15/250.451
5,392,488 A * 2/1995 Li ............................ 15/250.41

FOREIGN PATENT DOCUMENTS

| JP | 56-138048 | * 10/1981 | ............. 15/250.452 |
| WO | 93/11979 | * 6/1993 | ............. 15/250.451 |

* cited by examiner

*Primary Examiner*—Gary K. Graham
(74) *Attorney, Agent, or Firm*—William B. Noll

(57) ABSTRACT

A three piece wiper blade mechanism for mounting to a conventional automotive wiper blade assembly featuring an elongated arm having plural pairs of C-configured claw arms for removably attaching to the mechanism. The three piece wiper mechanism comprises a first, elongated plastic housing, preferably permanently received within the claw arms, a second, elongated plastic insert for slidably engaging the first housing, and a rubberized wiper blade element in fixed engagement with the second insert. By the use of plastic sliding on plastic, a new wiper blade element and second insert may be readily inserted into the first plastic housing, especially for the do-it-yourself mechanic.

4 Claims, 4 Drawing Sheets

READILY REPLACEABLE AUTOMOTIVE WIPER BLADE

FIELD OF THE INVENTION

This invention is directed to the field of automotive wiper blade assemblies, more particularly a slidably readily replaceable wiper blade into a harness assembly, especially by a do-it-yourself mechanic.

BACKGROUND OF THE INVENTION

The present invention is directed to a readily mounted automotive wiper blade element, especially by a novice wishing to avoid the costly expense that may be charged by a commercial establishment. Wiper blades, typically formed of a flexible elastomeric or rubberized material, feature a narrowed section that traverses the automotive windshield at the end of a pivoting arm. Particularly in harsh weather environments, such as during the winter months when ice and snow can impact the windshield, frequent changing of the wiper blades are required. Most automotive outlets offer replacement wiper blades that are supposed to be slidably inserted into clamping elements of the pivoting arm. Unfortunately, these replacement blades are difficult for the layman to make. That is, once a wiper blade is removed, the new one must be inserted. The layman must line up the receiving blade slot along the pivoting arm of the wiper blade mechanism with the channel/groove thereof, and then slide the new rubberized blade into this small channel hoping it will not jam. Rubber against plastic presents an opportunity for jamming, particularly as the space between the two materials is quite small.

The present invention, by its unique design and construction, avoids the problems associated with the existing practices known today for replacing automotive wiper blade elements. Notwithstanding these practices, there have been a number of early attempts to improve the performance of wiper blade assemblies, where said attempts are reflected in the following U.S. Patents:

a.) U.S. Pat. No. 6,314,608, to Fisher et al., teaches a wiper blade for a windshield wiper blade refill that includes a crown located at the top of the wiper blade. The bottom of the wiper blade has a windshield-engaging lip. A neck extends from the crown toward the lip, and the neck increases in width in a direction away from the crown.

b.) U.S. Pat. No. 5,933,910, to Buechele et al., relates to a retainer clip for a wiper blade, comprising a hollow body or cap for receiving the end portion of an associated backing strip. The body is formed with flanges which locate in respective grooves of the backing strip. Legs with a latch portion to locate a claw termination of a windshield wiper superstructure extend from the flanges in a longitudinal direction and are also received in the longitudinally-extending grooves of the backing strip.

c.) U.S. Pat. No. 5,208,939, to Oulie, is directed to a wiping strip, in particular for a windshield wiper blade of an automotive vehicle, comprises a wiping lip and at least one stiffening element for stiffening the lip. The wiping lip and the stiffening element are secured together by clipping one within the other, by means of mutual interengaging means which are provided between the wiping lip and the stiffening element.

d.) U.S. Pat. No. 3,879,794, to Roberts, Jr., teaches a replaceable squeegee assembly or refill unit for a windshield wiper blade that incorporates a multi-use backing strip for supporting a rubber-like squeegee element. The backing strip may be integrally formed of molded or extruded plastic material. A pair of squeegee holders, each in the form of a channel-shaped body having inwardly extending opposed flanges at the outer ends of the legs of the channel, are arranged in back-to-back relationship and include a common web portion. A pair of elongate side rails extending longitudinally for the entire length of the channel bodies extending laterally outwardly are provided on the legs of the channel bodies. The side rails associated with each channel body are coplanar; the distance between the longitudinal edges of one pair of side rails is greater than the distance between the longitudinal edges of the other pair of side rails. The differences in the overall lateral width of the pairs of side rails permit use of the backing strip in different superstructures having pairs of opposed claws for slidably receiving the side rails which are spaced apart different distances. The squeegee element may be slidably received in either of the squeegee holders while the side rails on the unused squeegee holder are received between the claws of the superstructure. A clip which interlocks with the backing strip adjacent the end thereof serves to retain the squeegee element within the squeegee holder and also serves to limit the longitudinal displacement of the refill unit relative to the superstructure.

e.) U.S. Pat. No. Re. 29,392, to Moorhead et al., relates to a windshield assembly for a curved windshield that includes a pressure distributing superstructure having claws adapted to engage a blade structure at longitudinally spaced positions, together with a blade structure including a flexible holder having a pair of laterally opening slots for receiving the claws of the superstructure, and a longitudinal retention chamber receiving an enlarged retention bead along the upper edge of a resilient wiping element.

While the foregoing prior art offer a number of innovations for an automotive wiper blade, especially in the field of replacement items, none present an easy and simple system to provide a wiper blade refill in the manner of the present invention. The manner by which this invention achieves the goals hereof will become more apparent in the description which follows, particularly when read in conjunction with the accompanying drawings.

SUMMARY OF THE INVENTION

This invention relates to an improved rubber-like wiper blade element that is particularly suitable for easy replacement onto a conventional automotive wiper blade assembly. The invention is directed to the combination of such assembly, where the assembly comprises a pivotal arm, pivotal about a first end, and a free end mounting plural C-configured claw arms extending therefrom, with each claw arm consisting of a pair of free ends spaced apart and extending toward one another. Combined therewith is a three part, readily replaceable wiper blade element. The element comprises a first, elongated plastic housing featuring an upper surface, a pair of side walls having inwardly directed channels for engagement with the free ends, and a bottom wall having an elongated channel, where the elongated channel includes a generally circular slot extending upwardly into the body of the housing. Cooperating with the elongated plastic housing is an elongated plastic insert for sliding engagement with the elongated channel of the housing, where the insert includes an upper surface featuring an elongated rib for sliding engagement with the generally circular slot, and a lower surface featuring a T-configured channel. Finally, the wiper blade element includes an elongated, rubberized wiper blade comprising a generally triangular body having an upper surface and a tapered wiping end extending from the upper surface, where the upper surface includes a T-configured rib for engagement with the T-configured channel, where the latter two elements is permanently fixed together. Preferably, the plastic insert is fully contained within the plastic housing, such that its lower surface is planarly aligned with the bottom wall of the housing.

Accordingly, a feature of this invention is the provision of an automotive wiper blade element that may be easily inserted into the wiper blade assembly, as known in the art.

Another feature hereof lies in the use of a three piece wiper blade element that includes intermatable components formed of plastic to allow for the easy engagement of the components.

Still another feature lies in the use of a rubberized wiper element configured to slidably engage with one of the intermatable components.

A further feature hereof is the provision of a first component for sliding engagement with the conventional wiper blade assembly of an automotive vehicle.

These and other features of the invention will become more apparent from the description which follows, particularly when read in conjunction with the accompanying drawings.

DETAILED DESCRIPTION OF PREFERRED EMBODIMENTS

Figure 1:
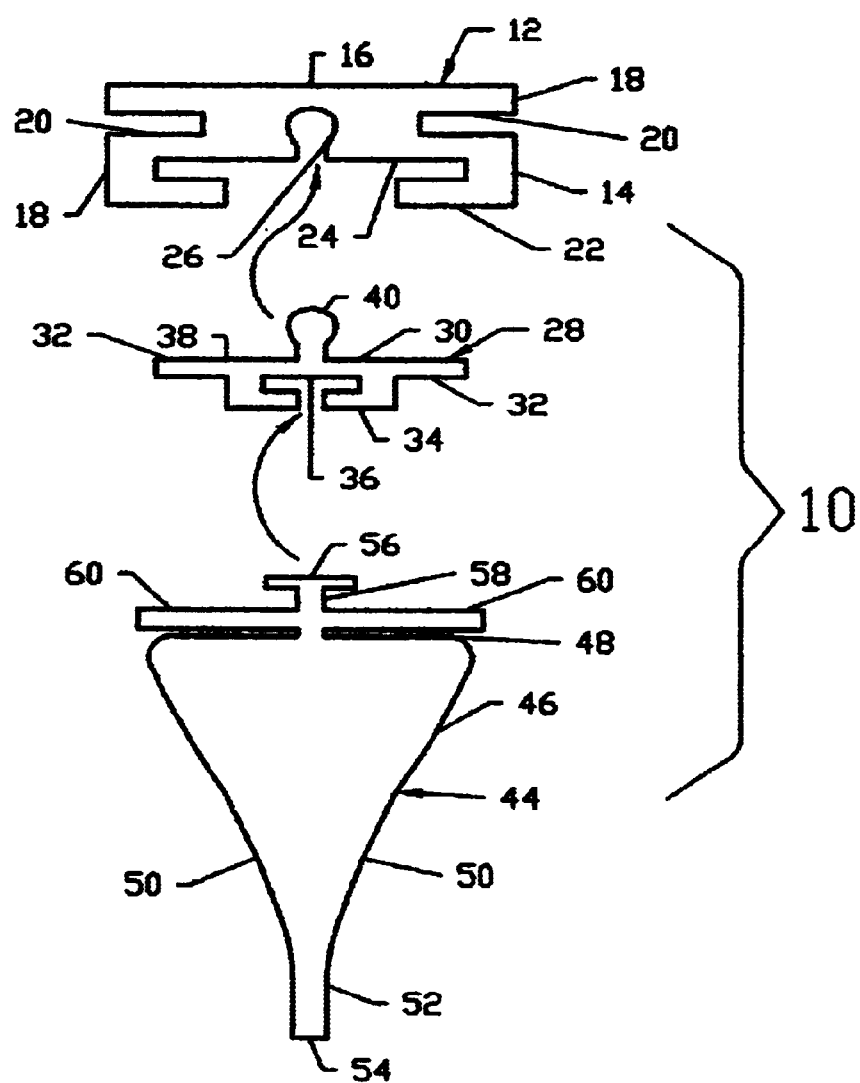
FIG. 1 is an exploded sectional view of the several components showing the readily replaceable automotive wiper blade assembly according to the present invention.

The present invention is directed to an easily replaceable automotive, three component wiper blade element, where a pair of the components are fixed together prior to installation and mounting to a conventional vehicular wiper assembly, where said assembly typically comprises one or a pair of pivotal arms that traverse the viewing area of the vehicle windshield. The arm(s) includes a free end that mounts plural pairs of C-configured claw arms extending toward the windshield. Each claw arm comprises a pair of free ends spaced apart and directed toward and planarly aligned with one another. The wiper blade element, as used for mounting onto the conventional vehicular wiper assembly, will now be described with regard to the accompanying Figures, where like reference numerals represent like components or features throughout the several views.

Figure 2:
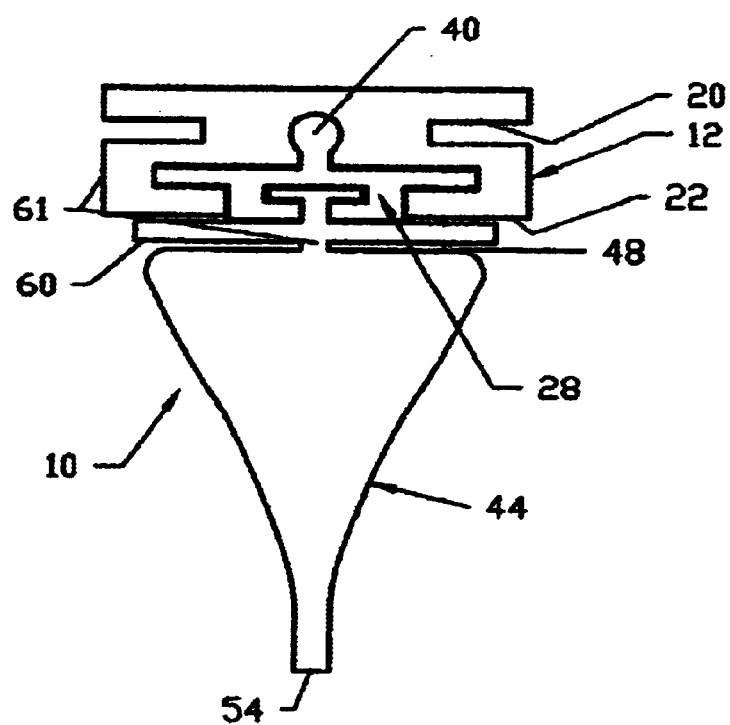
FIG. 2 is a sectional view of the assembled components of FIG. 1.

Turning first to FIGS. 1 and 2, illustrating the three component wiper blade element 10 of this invention, FIG. 1 shows the three interlocking components forming the wiper blade element 10 hereof. A first said component is an elongated plastic channel member 12 comprising a housing body 14 featuring a planar top wall 16, a pair of side walls 18, where each side wall includes an inwardly directed slot 20. The housing body 14 is laterally sized to be slidably received between the respective C-configured claw arms, just described, with the opposing free ends thereof seating within the slots 20. The lower surface 22 includes a T-configured channel 24 and a generally circular, elongated slot 26 extending upward into the housing body 14. Though formed of plastic, the channel member 12 is sufficiently flexible to conform to the curved shape of an automotive windshield. In a commercial automotive application, the plastic channel member 12 would become a fixed component to the wiper assembly, whereas the latter two components are preferably fixed to one another for easy replacement when desired.

For slidable mounting into said T-configured channel 24 is the second component, a flexible elongated plastic insert 28. The insert 28 comprises a housing body 30 having a pair of lateral wing portions 32, and a lower body portion 34 characterized by a T-shaped channel 36. The upper surface 38 features an upstanding, centrally disposed, elongated rib 40 of a size for sliding engagement with the generally circular slot 26. To facilitate said sliding engagement, the rib 40 may be coated, such as by a coating of TEFLON, a trademark. With the two components slidably engaging one another, where the insert 28 is fully received within said T-configured channel 24, the engaged components reveal an integral unit with an aligned lower surface 22, see FIG. 2.

The final or third component is the wiping blade element 44. The wiping blade element, fabricated of an elastomeric or rubberized material, as known in the art, comprises a generally triangular body 46 having a broad top surface 48 and a pair of converging side walls 50 terminating in a narrow flexible portion 52, where the end 54 represents the wiping surface for the assembly hereof. The upper surface 48 includes a T-configured, elongated member 56 sized for engagement by the manufacturer with the T-shaped channel 36. Extending laterally from the leg 58 are a pair of wing-like elements 60. In the assembled mode, as seen in FIG. 2, the wing-like elements lie contiguous with the aligned lower surface 22 to provide support to the wiping blade element 44. Note further, as best seen in FIG. 2, the wing-like elements 60 are spaced above the upper surface 48 by a narrow arm 61 to facilitate flexing of the wiping blade element 44 as it traverses back and forth across the automotive windshield.

Figure 3:
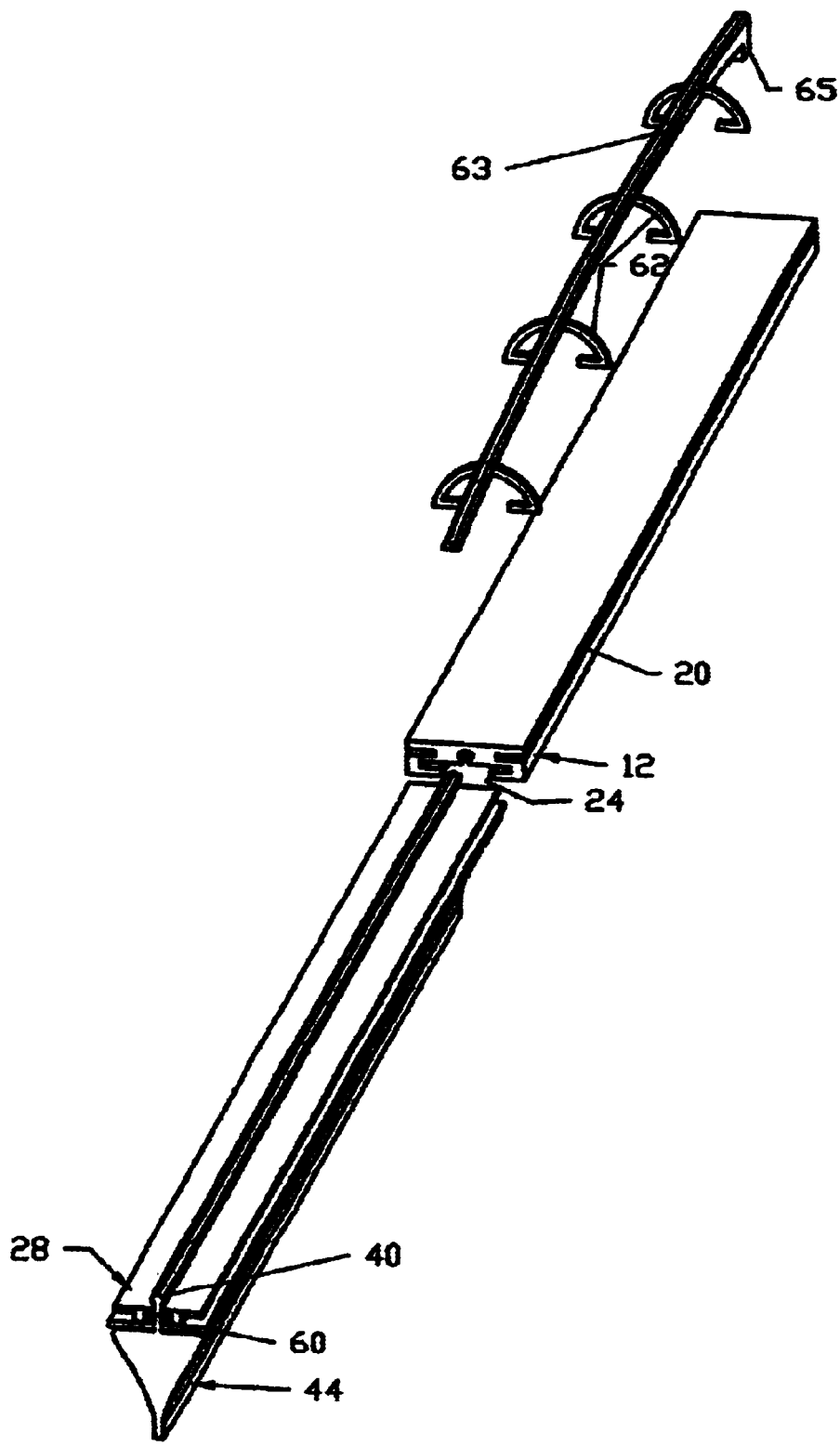
FIG. 3 is a partial perspective view of the readily replaceable automotive wiper blade assembly of this invention, showing further the wiper blade mounting mechanism that features a pivoting arm and plural claw elements.

FIG. 3 is an exploded perspective view showing the second, i.e. insert 28, and third, i.e. blade element 44, components mated to one another, where the mated components, preferably by the manufacturer, are poised for sliding engagement into the first component, i.e. channel member 12. Overriding the third component is a showing of a conventional pivoting wiper blade assembly having plural C-configured claw arms 62, for engaging the opposing slots 20, extending from a pivotal arm 63, pivotal about a first end 65. It is thus apparent that the do-it-yourselfer can easily and readily mount the mated components 28, 44 to the channel member 22 and avoid the conventional hassle of trying to mount a rubber wiper blade to the wiper assembly, a frustrating experience to many.

Figure 4:
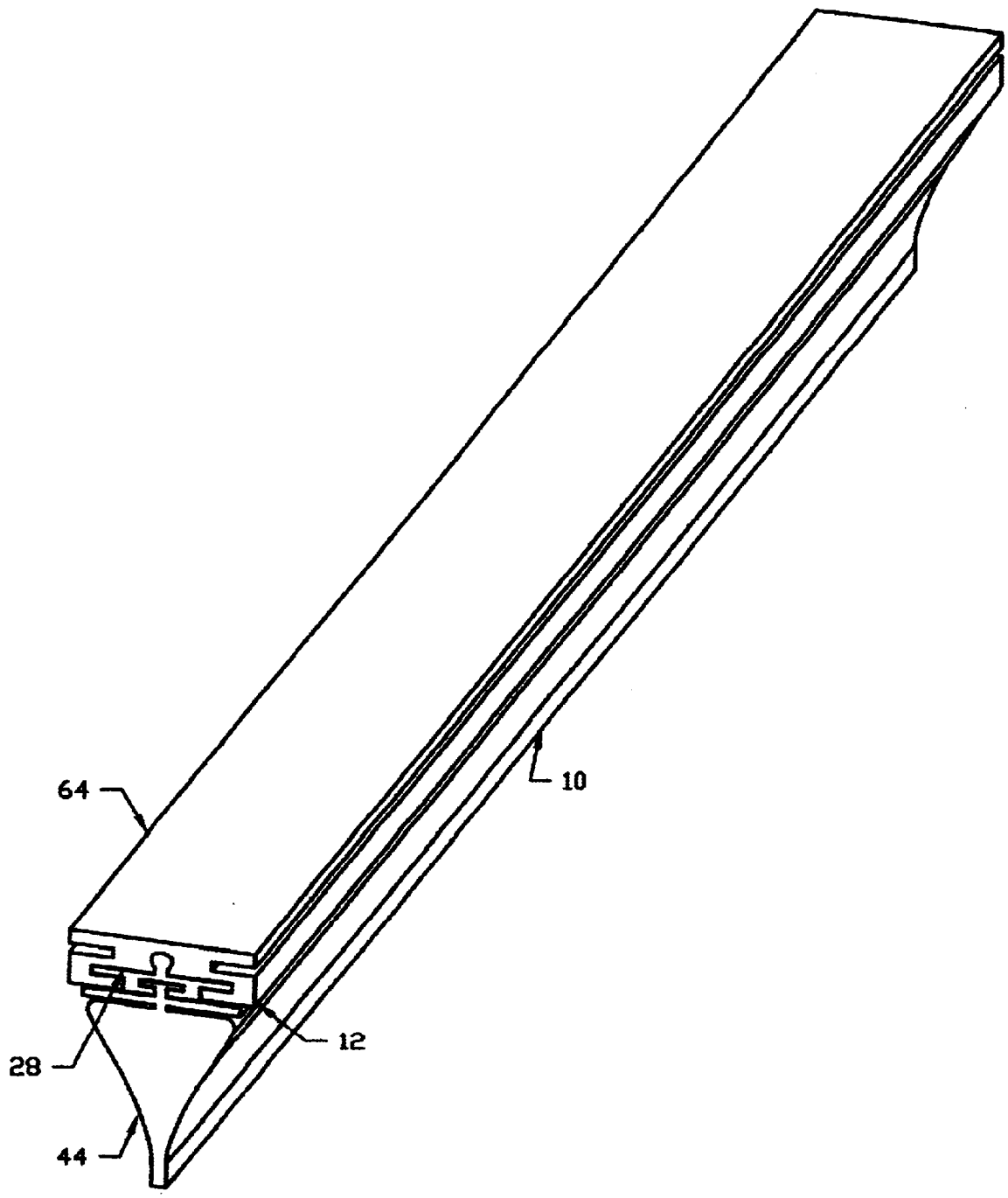
FIG. 4 is an assembled perspective view of the wiper blade assembly hereof.

FIG. 4 illustrates in perspective the assembled three part wiper blade element 10 according to this invention. The Figure illustrates further a metal tab 64, as known in the art, to lock the assembly in position and avoid a premature release of the element. To replace a worn out blade element of the invention, the permanently mated components (second and third as described above) are inserted into the first component, i.e. insert 28. By sliding a plastic element into a plastic element, little resistance is encountered thus making the replacement process an easy task.

It is recognized that changes, variations and modifications may be made to the three part wiper blade element of this invention, especially by those skilled in the art, without departing from the spirit and scope thereof. Accordingly, no limitation is intended to be imposed thereon except as set forth in the accompanying claims.

I claim:

1. In combination with an automotive wiper blade assembly, where said assembly comprises a pivotal arm, pivotal about a first end, with said pivotal arm mounting plural C-configured claw arms extending therefrom, each claw arm consisting of a pair of free ends spaced apart and extending toward one another, a readily replaceable wiper blade element, said element comprising:

a.) a first, elongated plastic housing featuring an upper surface, a pair of side walls having inwardly directed channels for engaging with said free ends, and a bottom wall having an elongated channel, where said elongated channel includes a generally circular slot extending upwardly into the body of said housing;

b.) an elongated plastic insert for sliding engagement with said elongated channel, said insert including an upper surface featuring an elongated rib for sliding engagement with said generally circular slot, and a lower surface featuring a T-configured channel; and, c.) an elongated, rubberized wiper blade comprising a generally triangular body having an upper surface and a tapered wiping end extending from said upper surface, where said upper surface includes a T-configured rib for sliding engagement with said T-configured channel.

2. The combination according to claim 1, wherein said plastic insert is fully contained within said plastic housing, such that its lower surface is planarly aligned with said bottom wall.

3. The combination according to claim 2, wherein said T-configured rib includes a pair of laterally extending arms, where said laterally extending arms lie contiguous with said lower surface and said bottom wall.

4. The combination according to claim 1, wherein said elongated plastic housing and said elongated plastic insert form a matable integral unit in the assembled mode, said integral unit characterized by a common surface to provide support for said elongated, rubberized wiper blade.

* * * * *